Jan. 10, 1961 W. SHOCKLEY 2,967,952

SEMICONDUCTOR SHIFT REGISTER

Filed April 25, 1956 3 Sheets-Sheet 1

WILLIAM SHOCKLEY
INVENTOR.

BY Flehr & Swain
ATTORNEYS

WILLIAM SHOCKLEY
INVENTOR.

BY Flehr & Swain
ATTORNEYS

WILLIAM SHOCKLEY
INVENTOR.

BY [signature]
ATTORNEYS

United States Patent Office 2,967,952

Patented Jan. 10, 1961

2,967,952

SEMICONDUCTOR SHIFT REGISTER

William Shockley, 23466 Corta Via, Los Altos, Calif.

Filed Apr. 25, 1956, Ser. No. 580,513

10 Claims. (Cl. 307—88.5)

This invention relates generally to shift registers and more particularly to a semiconductor shift register.

It is an object of the present invention to provide a novel semiconductor shift register.

It is another object of the present invention to provide a semiconductor shift register which operates in response to controlling pulses.

It is another object of the present invention to provide a semiconductor shift register which includes a common region of semiconductive material having a plurality of semiconductor devices forming junctions therewith.

It is still another object of the present invention to provide a semiconductor shift register which includes a common semiconductive body of one conductivity type having a plurality of devices each including outer regions of opposite conductivity type and an intermediate region of the same conductivity type forming junctions therewith.

It is a further object of the present invention to provide a semiconductor shift register which includes a common semiconductive body having a plurality of devices each including outer regions of opposite conductivity type and an intermediate region of the same conductivity type forming junctions therewith and in which said devices are spaced from one another whereby diffusion of injected carriers serves to bias adjacent junctions.

It is still a further object of the present invention to provide a shift register which is inexpensively and easily manufactured and which is efficient and economical to operate.

The invention possesses other objects and features of advantage, some of which with the foregoing will be set forth in the following description of the invention. It is to be understood that the invention is not to be limited to the disclosure of the species of the invention described, as other embodiments thereof may be adopted within the scope of the claims.

Referring to the drawings.

Figure 6:
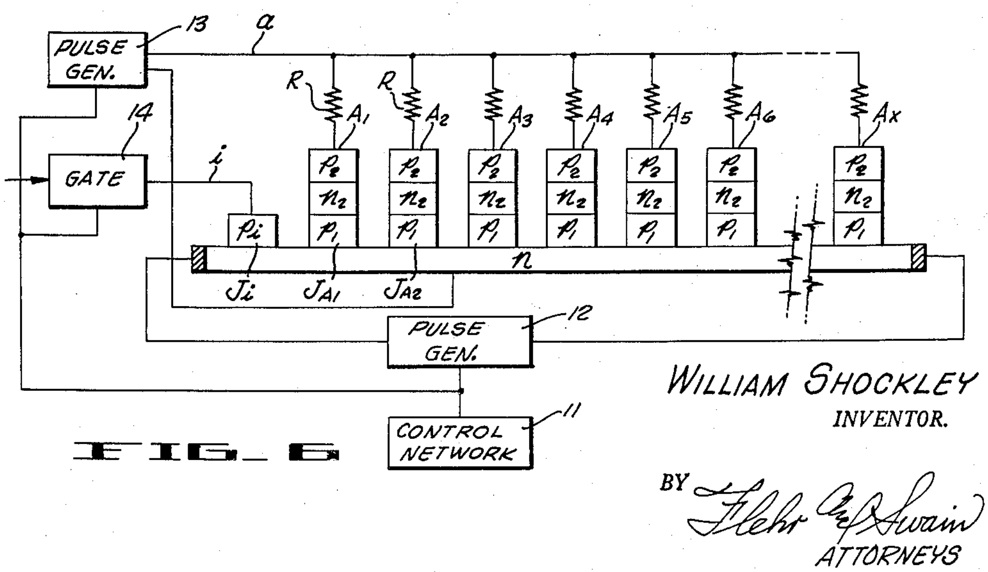
Figure 6 is a view illustrating an embodiment of my invention in which a single device forms a storage unit and in which a pulse longitudinal electric field serves to deflect injected carriers.
Figure 8:
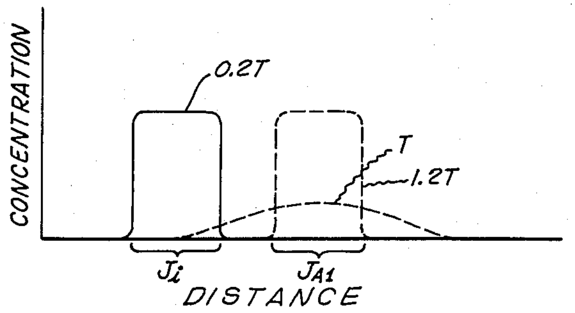

Figures 7A—7B show typical pulses employed to operate the register of Figure 6;

Figure 8 is a graph of concentration of carriers for various times; and

Figure 9:
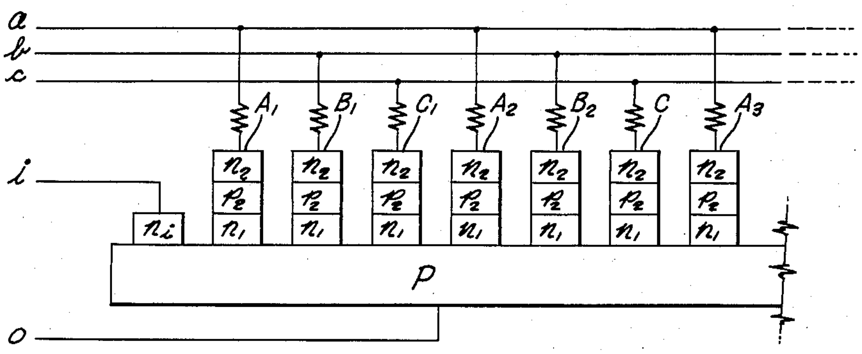

Figure 9 illustrates still another embodiment of my invention.

Figure 1:
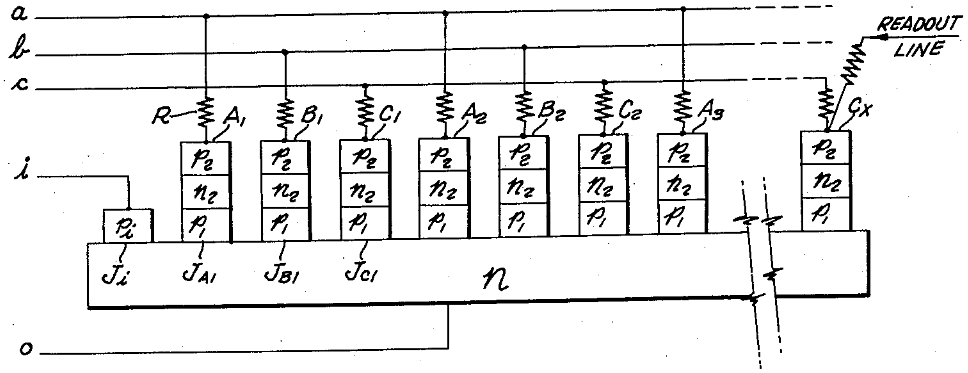
Figure 1 is a schematic diagram representing one embodiment of the invention.

Referring to Figure 1, the semiconductor shift register illustrated comprises an n-type body of semiconductive material having a plurality of semiconductive devices (islands) $A_1$, $B_1$, $C_1$, $A_2$, $B_2$, $C_2$, etc., contiguous therewith to form a plurality of junctions. The devices illustrated each have an n-type region $n_2$ which is intermediate the p-type regions $p_1$ and $p_2$. It is, of course, to be understood that the body may be formed of p-type semiconductive material with the plurality of devices (islands) each having n-p-n type regions, as illustrated in Figure 9.

Any suitable semiconductive material may be employed to form the shift register. For example, the body may be germanium or silicon to which is added impurities to form the proper conductivity type. Suitable layers of different conductivity types are formed on the body and the resulting block is cut mechanically, electrically or electrochemically to form suitable devices (islands) of the type described.

For example, to form the register shown in Figure 1, donor impurities may be added to pure germanium or silicon to form the body. Employing diffusion techniques, a p-type layer (region) is formed on the upper surface of the n-type semiconductive body. A layer of n-type semiconductive material is then formed on the p-type layer, and a third layer of p-type material is then formed on the n-type layer. This forms an n-type body having layers (regions or strata) of p-type, n-type, and p-type material on one surface. The block of material thus formed can then be cut into strips and machined to form the devices $A_1$, $B_1$, etc., as shown in Figure 1. A $p_i$ region is then diffused into the n-type common region to form the junction $J_i$.

The register formed as described will then include a plurality of devices (islands) $A_1$, $B_1$, etc. which are adjacent to one another and which form junctions $J_{A1}$, $J_{B1}$, etc. with the n-type body. The spacing between the devices will depend upon the diffusion rate of injected minority carriers in the common semiconductive region, the lifetime and concentration of the carriers, and the cycle rate of the register, as will be presently described.

A triggering or switching semiconductor device which will be triggered in response to a predetermined triggering voltage may be formed with four regions, n-p-n-p. A device of this type will trigger from a low conducting (high resistance) to a high conducting (low resistance) state in response to a voltage having a predetermined amplitude. The voltage across the device is applied with a polarity which serves to bias the end junctions in a forward direction and to reversely bias the center junction. The device may then be viewed as a pair of complementary transistors with the center junction acting as the collector of each. As the voltage is increased, avalanche sets in at the center (collector) junction. The current increases rapidly. If means are provided whereby the complementary transistors have low alphas for low current densities and high alphas for high current densities, then when avalanche sets in the sum of the alphas for the two transistors will be greater than one and the device will make a rapid transition to the high conductance condition. The voltage required to sustain conduction will be considerably less than the voltage required to trigger or switch the device.

It is apparent upon a study of the shift register shown in Figure 1 that each of the devices $A_1$, $B_1$, $C_1$, etc. may be considered an n-p-n-p semiconductor device. By placing the devices or islands near one another, carriers injected into the body at the junction formed therewith will spread by diffusion to adjacent junctions. These carriers diffuse across the adjacent junctions and serve to bias the same in a forward direction. The emitter current and the currents flowing across the junctions (emitter and central junctions) is increased. As previously described, the alpha of the junction increases with current.

With sufficient bias the alphas increase whereby the device is biased into a conducting state. Application of a voltage considerably less than the voltage required to switch or trigger an unbiased n-p-n-p device will cause the device to conduct large currents.

Figure 3:
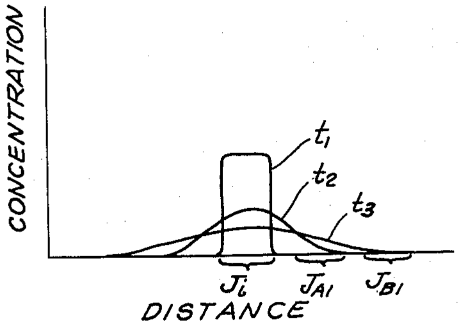
Figure 3 is a graph of concentration of carriers as a function of distance for various times.

Referring to Figure 1 again, a pulse which applies forward bias to the junction $J_1$ will serve to inject holes into the n-type body. The injected holes (carriers) spread by diffusion in a manner which is illustrated in the graph of Figure 3. This graph shows carrier concentration as a function of distance for various times. The concentration of carriers adjacent the junction $J_1$ is shown by the curve $t_1$ immediately after application of the pulse to line *i*. A short interval of time later, the distribution is shown by the curve $t_2$. The carriers have spread by diffusion in both directions from the junction $J_1$, some of the carriers having diffused as far as the junction $J_{A1}$. At the time $t_3$, more spread has taken place and more carriers are adjacent the junction $J_{A1}$ with a few of the carriers having diffused as far as the junction $J_{B1}$. Recombination is taking place in the n-type region and the total number of carriers is decreasing with time.

Minority carriers in the vicinity of the junction $J_{A1}$ diffuse into the $p_1$ region where they provide a forward bias for the junction, as previously described. This forward bias improves the alpha of the pair of junctions. If the bias is sufficient to increase the alphas of the device $A_1$ so that their sum is greater than one, the device will trigger in the conducting state and will carry large currents for a pulse having an amplitude less than the switching voltage required for an n-p-n-p device.

It is apparent that the pulse (Figure 2A) must be applied to the line *a* at a predetermined time interval after the application of the pulse at the line *i*, the time depending upon the diffusion, recombination and concentration of minority carriers. Preferably, the various devices (islands) are spaced as close as possible to one another whereby the carriers rapidly diffuse over to the adjacent junction to bias the same. This increases the speed of operation of the register, since the carriers have to diffuse a lesser distance to bias the adjacent junction. The time lapse required between the input pulse and the application of a shifting or control pulse to the line *a* may be controlled by controlling the diffusion constant of the body, by controlling the spacing between the various devices (islands), and by controlling the magnitude of the pulse applied to the line *i* (the concentration of minority carriers).

Referring again to Figure 1, driving lines *a*, *b* and *c* are connected to the devices A, B and C respectively through current limiting resistors R. By application of pulses sequentially to the lines *a*, *b* and *c*, the register serves to shift bits of information introduced on the line *i*, as will be presently described. In the embodiment shown in Figure 1, each storage cell which serves to store a bit of information comprises three devices A, B and C. Thus, devices $A_1$, $B_1$ and $C_1$ form one storage cell, $A_2$, $B_2$ and $C_2$, another storage cell, etc.

Figure 2:
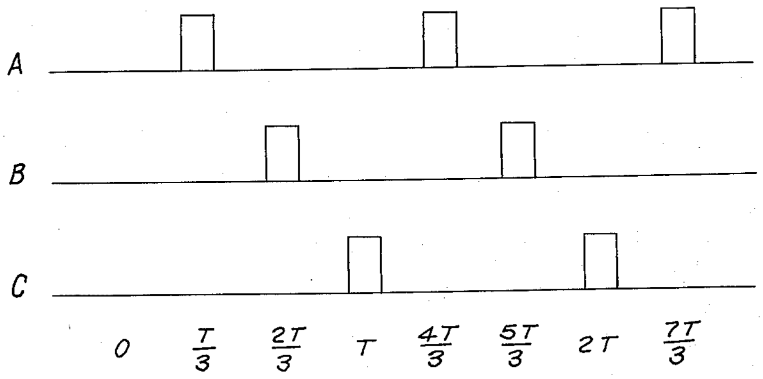
Figures 2A–2C show typical pulses employed to operate the shift register of Figure 1.

Referring to Figures 1, 2 and 3, operation of the device is as follows: Consider, for example, the condition where a pulse is applied to the line *i*, causing injection of holes into the n-type body. At the time $T/3$, the carriers which have diffused to the junction $J_{A1}$ have reached approximately their maximum concentration. If the pulse (Figure 2A) which has an amplitude less than the switching voltage for an unbiased device is applied to the line *a*, the device $A_1$ will carry a current limited by the series resistor R. The pulse on line *a* will not cause devices $A_2$, $A_3$ etc. to switch since the amplitude of the pulse is less than the switching voltages for the devices. The junctions $J_{A2}$ and $J_{A3}$ are sufficiently removed from the junction $J_1$ that no carriers will diffuse to these junctions to bias the same into the conducting state. When the device $A_1$ switches into a conducting condition, the $p_1$ region will inject carriers (in this case, holes) into the n-type body. The carriers injected by the device $A_1$ will diffuse toward the junctions $J_1$ and $J_{B1}$ and $J_{C1}$.

If, at a predetermined time later, time $2T/3$, a pulse is applied to the line *b*, the device $B_1$ will switch into a conducting state; devices $B_2$ etc. will not be switched since they are not sufficiently biased by injected minority carriers. The time lapse between the injection of carriers by the device $A_1$ and the application of a voltage pulse to the line *b* is dependent upon the spacing of the devices, the density of the injected carriers, and the diffusion and recombination rates of the n-type body, as has been previously described. The device $B_1$ injects carriers into the n-type body. The carriers diffuse toward the junctions $J_{C1}$, $J_{A2}$, etc. and toward the junctions $J_{A1}$ and $J_1$. A pulse applied to either the line *a* or *c* will cause the respective devices $A_1$ or $C_1$ to become conducting. In order for the wave to travel forward, the line *c* is energized at time T, thereby switching the device $C_1$ into a conducting state. The device $C_1$ will then inject carriers as previously described, which will serve to spread by diffusion to adjacent junctions.

It is apparent that during the period of time 0–T, the devices $A_2$, $B_2$, and $C_2$ have not been switched into a conducting state, since the amplitude of the voltage pulses applied did not exceed the breakdown voltage for the devices, and none of the devices were biased by diffusing minority carriers.

Application of a pulse to line *a* at time $4T/3$ will cause device $A_2$ to become conducting. If the carriers are injected in great quantities, they may diffuse back to $A_1$ where application of a pulse at $4T/3$ will cause it to become conducting regardless of whether or not a pulse was applied to line *i*. In such event, the amplitude of the pulses may be reduced or the values of the resistors increased. The concentration will then be such that they will die out in the time T whereby they will be ineffective in supporting a backward wave.

It is convenient to represent digital information representing "1" by conduction and information representing "0" by non-conduction. A new bit of information representing "1" should be introduced to the line *i* at the instant line *c* is pulsed. Thus, if a "1" is introduced at time 0, T, 2T, etc., a conducting state will be generated and transferred from device to device along the series progressing from *i* to $C_1$ in time T and from $C_1$ to $C_2$ in an additional time T, etc. On the other hand if an "0" is introduced by not pulsing *i* at any of the times 0, T, 2T, etc., then the "0" will be transmitted in the form of a non-conducting state from *i* to $C_1$ in a time T, etc.

It is apparent that three devices are necessary to make up a storage unit of the shift register illustrated in Figure 1, each of the units serving to store one bit of information. One cycle is represented by the time 0–T which represents pulses applied successively to the lines *a*, *b* and *c*. In the foregoing example, the information originally stored in the first storage unit comprising devices $A_1$, $B_1$, and $C_1$, has been shifted to the second storage unit comprising the devices $A_2$, $B_2$ and $C_2$ in the time T.

Suitable circuits may be employed for gating the information to the line *i* whereby the information is applied simultaneously with the application of pulses to the line *c*.

The information in the shift register may be held stationary by repeatedly pulsing one of the lines without pulsing the others. Under these conditions, each conducting device will reactivate itself, but the spread of carriers from one device to the next one of the same type, i.e., from one A device to another A device, cannot occur since the distance is three times the distance between elements and the register is so designed that adequate transmission of carriers is only produced between an element and the next adjacent element, as previously described.

It is, of course, apparent that by controlling the sequence in which the lines are pulsed the information may be transferred in either direction, as desired. For example, if line *b* is pulsed after line *c*, the information will travel to the left, as represented by Figure 1, rather than to the right.

The information may be read serially from the register by applying a pulse to the readout line associated with the last device $C_x$ simultaneously with the pulsing of the line *c*. If the device $C_x$ is conducting (representing "1"), a high current will flow whereas if the device $C_x$ is nonconducting (representing "0"), no current will flow. Of course, if it is desirable, the information may be read out of any one of the devices by pulsing the device at the appropriate time. The information may also be obtained in parallel by pulsing any one of the devices A, B or C of each of the storage units as the respective line *a*, *b* or *c* is pulsed.

Figure 4:
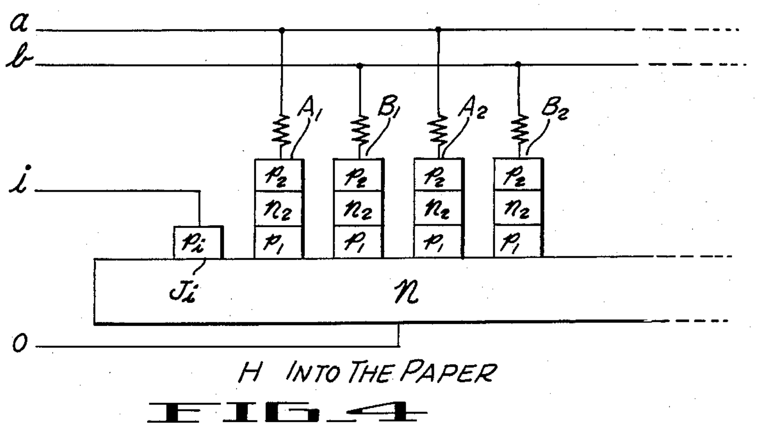
Figure 4 is a view illustrating an embodiment of the invention in which two devices form a storage unit and in which a magnetic field serves to deflect injected carriers.

The shift register illustrated in Figure 1 requires three devices to form a storage unit or cell in order that information be transferred in one direction. In the embodiment illustrated in Figure 4, two devices form each storage unit or cell. The device illustrated includes devices $A_1$, $B_1$, $A_2$, $B_2$, etc. which are connected to driving lines *a* and *b* through the resistors R. A suitable junction for injecting carriers is formed at $J_i$. As before, the information is suitably gated to the line *i* whereby carriers are injected into the n-type body. As in the previous example, by pulsing the line *a*, a suitable time subsequent thereto, when the carriers have attained the approximate maximum concentration in the adjacent junction $J_{A1}$ to bias the same into a conducting state, the device $A_1$ will carry a current limited by the associated resistance. In the previous example, the carriers spread by diffusion in all directions, as illustrated in Figure 3. In the example shown in Figure 4, a transverse magnetic field H, having a direction into the paper, for the example illustrated, is applied to the device. A relatively large number of the carriers which are injected by the $p_i$ region are deflected to the right to bias the junction $J_{A1}$. Similarly, relatively large numbers of carriers injected by the devices (islands) $A_1$, $B_1$, $A_2$, $B_2$, etc. will be deflected to the right to bias the junctions to the right, while relatively few of the carriers will diffuse to the left. Two devices suffice to form a storage unit. New information representing "1" may be introduced at the instant the line *b* is pulsed, whereby upon a subsequent application of a pulse to line *a*, the device $A_1$ will become conducting. If a pulse is not applied to the line *a*, the device $A_1$ will not become conducting, since, because of the magnetic field, few of the carriers injected by $B_1$ diffuse to $J_{A1}$.

Information may be transferred to the left by reversing the magnetic field, thus deflecting the carriers in the opposite direction. In all other respects, the device operates as the devices shown in Figure 1. Thus, the information may be removed serially at the end or in parallel from either one of the switching devices A or B of each cell. The information may be stored in a particular storage unit by repeatedly pulsing one of the lines.

Figure 5:
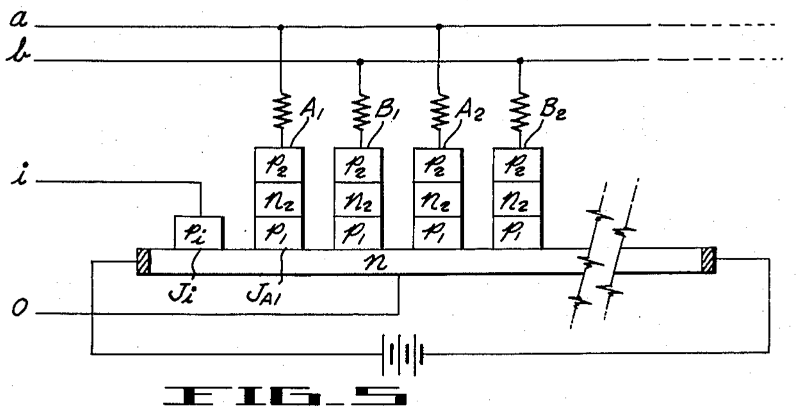
Figure 5 is a view illustrating an embodiment of my invention in which two devices form a storage unit and in which a longitudinal electric field serves to deflect the injected carriers.

Another shift register in which each of the storage elements comprises two switching devices is shown in Figure 5. In this embodiment, a relatively large number of the carriers which are injected are deflected to the right by means of a longitudinal electric field. Again, to reverse the direction of shifting of the information, the electric field is reversed.

In certain applications where a longitudinal electric field is employed, it may be desirable to make the body of semiconductive material very thin so as to reduce heating. This may be accomplished without loss of mechanical strength by forming the body of material as a thin layer of the requisite conductivity type on the surface of a more massive body of the opposite conductivity type. Electrical separation can be effectively produced and maintained by reversely biasing the resulting junction. Various means are well known for producing such layers. For example, impurities may be diffused from the outside, or a p-n junction may be grown from a melt and cut.

Figure 7:
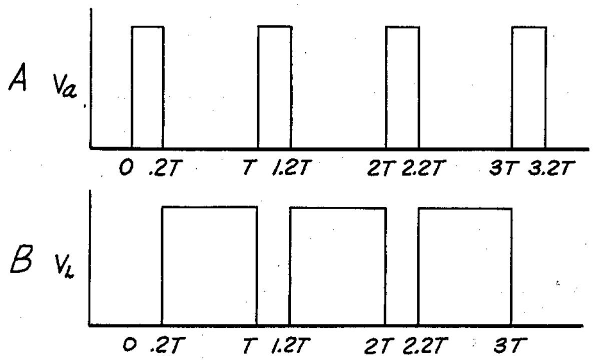

Figure 6 illustrates a shift register in which each of the storage units which serves to store a bit of information comprises a single device or island. A pulsed longitudinal electric field is employed to shift the information. Referring to Figure 7, suitable voltages are shown for operating the register. Thus a pulse is applied to the line *a* which has a short duration, for example, as shown 0–0.2T. A pulsed longitudinal voltage $V_L$ is then applied. As illustrated in Figure 7B, the longitudinal voltage pulse has a duration of approximately .8T extending from point 0.2T to T. Holes injected during the time 0 to 0.2T build up a high concentration below the junction $J_i$ as shown in Figure 8. The pulsed longitudinal electric field is then applied and causes the hole concentration to drift along the common body. After approximately 0.8T, holes have been displaced and are adjacent the device $A_1$ where they serve to bias the junction $J_{A1}$. As previously described, this serves to bias the associated device into a conducting state whereupon application of a pulse to line *a* causes a large current limited by the associated resistor R to flow through the device. Application of the next pulse to the line *a* will serve to inject holes at the device $A_1$ at 1.2T of Figure 8. The next longitudinal pulse will transfer the holes to the junction $J_{A2}$, etc.

The period T, the duration of the injection and the longitudinal pulses, and the magnitudes of the injection and the longitudinal pulses may be adjusted whereby the highest injected carrier density produced by one pulse will be found one unit to the right of the point of injection at the instant of application of the next pulse to line *a*. It is apparent that this will produce a transfer of bits of information with only one device being used to store each bit.

One advantage of pulsing the longitudinal field is that it moves the injected carriers after injection, rather than spreading them during injection. Another advantage is that it leaves the main body of material at one potential when a pulse is applied to the line *a*.

A control network 11 may be employed to control the operation of the longitudinal or sweeping pulse generator 12, the injection pulse generator 13, and the gate 14.

If the duration of the injection pulse is short compared to the time required to drift from one device to the next, a D.-C. field may be used provided, however, that the voltage wave on line *a* produces a distribution of voltages along the device which swings all of the junctions $J_{A1}$, $J_{A2}$, etc. from forward to reverse bias.

This can be accomplished in a variety of ways, such as connecting the resistor R associated with each device to a point on a voltage divider. It may also be achieved by making the voltage swing large compared to the voltage drop produced by the sweeping field, but small compared to the voltage required to break down the devices.

In Figure 9, a shift register similar to that shown in Figure 1 is illustrated. In this register, the body is of p-type material, rather than n-type material with the devices forming junctions therewith being of the n-p-n-type. It is apparent that this device will operate in a similar manner. The pulses applied will have a polarity opposite to that required for the device of Figure 1. It is apparent that all of the other devices previously described may also be formed of n-p-n type with a common base of p-type material.

The operation of the devices shown in Figures 1–9 may be enhanced by applying substantial reverse voltages between pulses whereby the devices are rapidly triggered into a non-conducting state.

Thus it is seen that I have provided a novel semiconductor shift register which serves to shift information in response to control pulses. The register is inexpensive and easy to manufacture, and economical and reliable in operation.

I claim:

1. A semiconductor shift register comprising a body of semiconductor material, a plurality of semiconductor devices forming a junction with said body, a portion of said body forming a region in each device and the junction being a junction in the respective device, each of said devices being adapted to be triggered from a low conducting to a high conducting state in response to a pulse having at least a predetermined amplitude and serving to inject carriers into the body when in a high conducting state, the devices being so spaced that the injected carriers diffuse to adjacent devices to bias the same, and said devices being arranged to form storage units each adapted to store a bit of information, means for injecting carriers into said body adjacent the first device in response to information, means for applying controlling pulses across the devices, said pulses having an amplitude which is sufficient to trigger biased devices into a high conducting state but less than the triggering voltage of an unbiased device, said controlling pulses being so timed and applied that they serve to shift the input information to successive devices or store the information, and means connected to at least one device for reading out the information.

2. A semiconductor shift register as in claim 1 wherein each of said devices including the body region includes p-n-p-n conductivity type regions.

3. A semiconductor shift register comprising a body of semiconductor material, a plurality of semiconductor devices forming a junction with said body, a portion of said body forming a region in each device and the junction being a junction in the respective device, each of said devices being adapted to be triggered from a low conducting to a high conducting state in response to pulses having at least a predetermined amplitude and serving to inject carriers into the body when in a high conducting state, the devices being so spaced that injected carriers diffuse to adjacent devices to bias the same, and said devices being arranged in threes to form storage units each adapted to store one item of information, means for injecting carriers into said body adjacent the first device in response to an information pulse, three control lines, alternate control lines being connected to successive ones of said devices with like devices in each of said storage units connected to the same line, means for applying controlling pulses along said lines and across the devices, said pulses having an amplitude which is sufficient to trigger biased devices into a high conducting state but less than the triggering voltage, said pulses having a predetermined timing whereby the information is shifted to successive devices or stored, and means connected to at least one device for reading out the information.

4. An apparatus as in claim 3 wherein each of said devices including the body region includes p-n-p-n conductivity type regions.

5. A semiconductor shift register comprising a body of semiconductor material, a plurality of semiconductor devices forming a junction with said body, a portion of said body forming a region in each device and the junction being a junction in the device, each of said devices being adapted to be triggered from a low conducting to a high conducting state in response to a pulse having at least a predetermined amplitude and to inject carriers into the body when in a high conducting state, said devices being so spaced and arranged that injected carriers diffuse to adjacent devices to bias the same, an adjacent pair of said devices forming a storage unit adapted to store information, means for injecting carriers into said body adjacent the first device in response to information, a pair of lines alternately connected to successive ones of said devices, means for applying controlling pulses to said lines across said devices, said pulses having an amplitude which is sufficient to trigger biased devices into a high conducting state but less than the triggering voltage, means for deflecting said injected carriers towards one or the other of the adjacent devices, said pulses having a predetermined timing whereby the information is shifted to successive devices in the direction of deflection of the carriers or stored, and means connected to at least one device for reading out the information.

6. An apparatus as in claim 5 wherein said body is an elongated body having the devices arranged substantially in line along the same and wherein said means for deflecting the carriers comprises an electric field applied longitudinally of said body.

7. Apparatus as in claim 5 wherein said body is an elongated body, and wherein said means for deflecting the carriers comprises a magnetic field applied transverse to the longitudinal axis of said body.

8. Apparatus as in claim 5 wherein each of said devices including the body region includes p-n-p-n conductivity type regions.

9. A semiconductor shift register comprising an elongated body of semiconductor material, a plurality of semiconductor devices forming a junction with said body, a portion of said body forming a region in each device and the junction being a junction in the device, each of said devices being adapted to be triggered from a low conducting to a high conducting state in response to pulses having at least a predetermined amplitude and serving to inject carriers into the body when in a high conducting state, said devices being so arranged that injected carriers diffuse to adjacent devices to bias the same, each of said devices forming a storage unit adapted to store one bit of information, means for injecting carriers into said body adjacent the first device in response to an information pulse, a line connected to each of said devices, means for applying controlling pulses to said line across said devices, said pulses having an amplitude which is sufficient to trigger biased devices into a high conducting state but less than the triggering voltage, and means for applying pulses longitudinally of said body to deflect the carriers longitudinally of said body, said longitudinal and controlling pulses being timed whereby the information is shifted to adjacent devices or stored.

10. Apparatus as in claim 9 wherein each of said devices including the body region includes p-n-p-n conductivity type regions.

References Cited in the file of this patent

UNITED STATES PATENTS

| | | |
|---|---|---|
| 2,553,490 | Wallace | May 15, 1951 |
| 2,586,080 | Pfann | Feb. 19, 1952 |
| 2,594,336 | Mohr | Apr. 29, 1952 |
| 2,600,500 | Haynes et al. | June 17, 1952 |
| 2,655,607 | Reeves | Oct. 13, 1953 |
| 2,655,610 | Ebers | Oct. 13, 1953 |
| 2,663,806 | Darlington | Dec. 22, 1953 |
| 2,663,830 | Oliver | Dec. 22, 1953 |
| 2,689,930 | Hall | Sept. 21, 1954 |
| 2,735,948 | Sziklai | Feb. 21, 1956 |
| 2,756,285 | Shockley | July 24, 1956 |
| 2,770,740 | Reeves et al. | Nov. 13, 1956 |
| 2,790,037 | Shockley | Apr. 23, 1957 |
| 2,856,544 | Ross | Oct. 14, 1958 |
| 2,877,358 | Ross | Mar. 10, 1959 |